United States Patent [19]

Eckert

[11] Patent Number: 4,634,560
[45] Date of Patent: Jan. 6, 1987

[54] ASPIRATOR PUMP AND METERING DEVICE

[75] Inventor: Charles E. Eckert, Plum Boro, Pa.

[73] Assignee: Aluminum Company of America, Pittsburgh, Pa.

[21] Appl. No.: 752,966

[22] Filed: Jul. 8, 1985

Related U.S. Application Data

[63] Continuation-in-part of Ser. No. 584,766, Feb. 29, 1984, abandoned.

[51] Int. Cl.$^4$ .............................................. B01F 3/04
[52] U.S. Cl. ...................... 261/76; 239/338; 261/DIG. 65; 261/78.2; 417/174; 417/196
[58] Field of Search ............ 261/76, 78 A, 66, 72 R, 261/16, 19, DIG. 54, DIG. 75, DIG. 65; 239/338, 340, 398, 8–10; 48/190; 137/3, 7, 14; 75/68 R, 93 E; 73/202; 417/163, 174, 151, 196, 192, 198

[56] References Cited

U.S. PATENT DOCUMENTS

| Re. 19,581 | 5/1935 | Justheim | 417/196 |
|---|---|---|---|
| Re. 21,416 | 4/1940 | Sargent | 417/196 X |
| 749,645 | 1/1904 | Tuttle | 73/202 |
| 1,373,550 | 4/1921 | Chandler | 261/72 R |
| 1,455,069 | 5/1923 | Bluemel | 261/76 X |
| 1,465,449 | 8/1923 | Maegly | 261/69 R |
| 1,543,975 | 6/1925 | Baverey | 261/121 A |
| 1,556,050 | 10/1925 | Vincent | 261/41 D |
| 1,592,982 | 7/1926 | Loepsinger | 261/78 A |
| 2,038,103 | 4/1936 | Fraser | 417/151 X |
| 2,268,656 | 1/1942 | Haltmeier | 417/196 |
| 2,379,551 | 7/1945 | Talley | 417/196 |
| 2,836,126 | 5/1958 | Ruth | 417/174 |
| 3,074,697 | 1/1963 | Friedell | 261/76 X |
| 3,220,710 | 11/1965 | Forster | 261/DIG. 54 |
| 3,369,735 | 2/1968 | Hoffmeister | 417/174 |
| 3,371,618 | 3/1968 | Chambers | 261/DIG. 75 |
| 3,373,978 | 3/1968 | Ellis | 261/16 |
| 3,451,409 | 6/1969 | Roche | 261/DIG. 54 |
| 3,494,296 | 2/1970 | Gluntz | 417/196 |
| 3,558,240 | 1/1971 | Snodgrass | 417/174 |
| 3,689,237 | 9/1972 | Stark et al. | 48/190 |
| 3,941,861 | 3/1976 | Hamalainen et al. | 261/19 |
| 4,260,563 | 4/1981 | Brulhet | 261/62 X |
| 4,392,888 | 7/1983 | Eckert et al. | 75/68 R |
| 4,396,355 | 8/1983 | Wilmot et al. | 417/196 X |

FOREIGN PATENT DOCUMENTS 1391595 4/1975 United Kingdom ................. 261/76

OTHER PUBLICATIONS

*Chemical Engineers' Handbook*, Fifth Edition by Robert H. Perry and Cecil H. Chilton, (McGraw-Hill, 1973), pp. 5-10, 5-11, 5-15, 5-16, 5-19, 5-20, 6-15.

Primary Examiner—Richard L. Chiesa
Attorney, Agent, or Firm—Douglas G. Glantz

[57] ABSTRACT

An apparatus is disclosed for controlling flow rates of a primary fluid including aspirating, mixing, and metering the primary fluid with a secondary fluid. In one aspect, the invention includes means for passing a secondary fluid of diluent gas through a venturi having specified proportions including discharge coefficient; and means for pumping primary fluid through venturi suction to pass through a primary fluid orifice of specified discharge coefficient wherein the venturi discharge coefficients of the venturi and the liquid orifice form a substantially linear proportionality over a wide range of flow rates through the venturi.

18 Claims, 2 Drawing Figures

U.S. Patent  Jan. 6, 1987  4,634,560
FIGURE 2
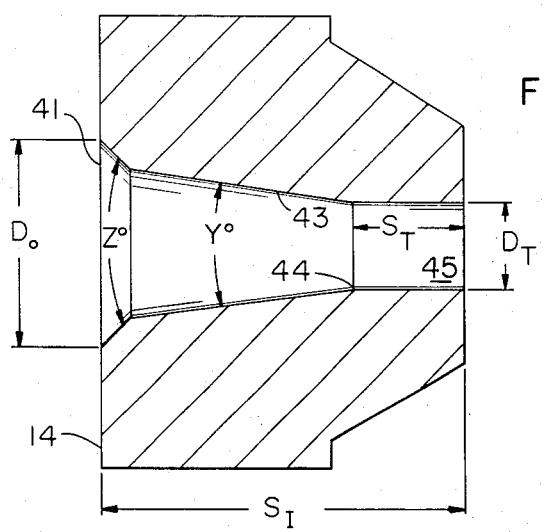
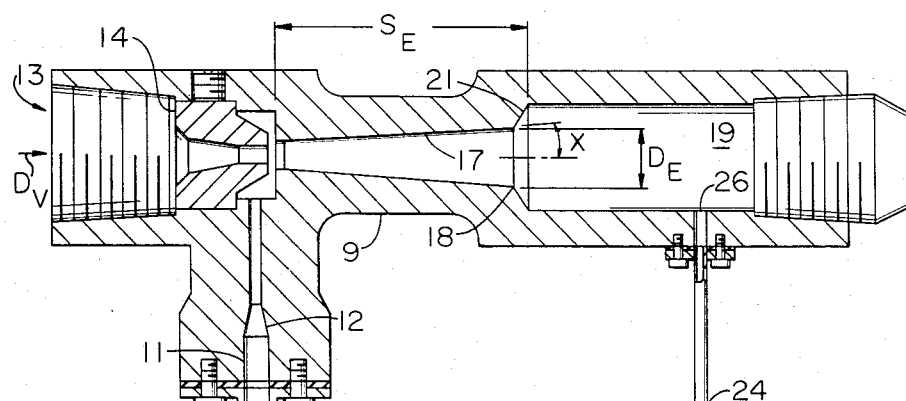
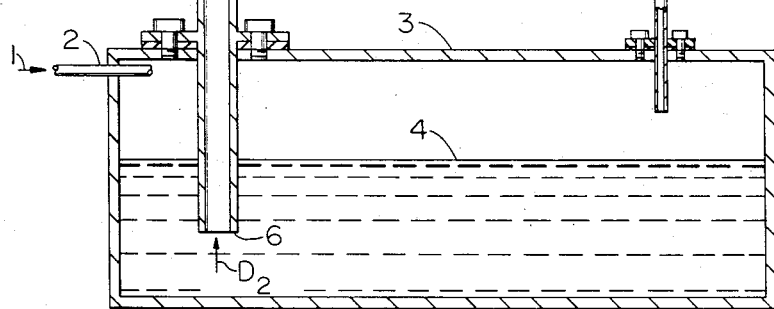
FIGURE 1

ASPIRATOR PUMP AND METERING DEVICE

CROSS-REFERENCE TO RELATED APPLICATION

This application is a continuation-in-part of prior co-pending patent application, Ser. No. 584,766, filed Feb. 29, 1984, now abandoned.

BACKGROUND OF THE INVENTION

This invention relates to an apparatus for controlling fluid flow. In one aspect, the invention relates to means for pumping and metering a corrosive, volatile, high density liquid at low flow rates.

Fluids can be moved through a conduit or tube by various means including pumps using centrifugal force, volumetric displacement, momentum transfer from one fluid to another fluid, or by gravity.

Design criteria for selecting pumps for a particular service include design factors such as the physical and chemical properties of the liquid to be handled, the total head or pressure increase to be achieved, and other factors such as the service temperature range. Centrifugal pumps and positive displacement pumps, e.g., of the reciprocating or piston type, are widely used but are not particularly suited for pumping corrosive fluids in a production environment. These types of mechanical pumps require close tolerances and dynamic seals which break down over time in for pumping corrosive fluids.

An acceleration of one fluid to transfer momentum to a second fluid is a principle commonly used in handling corrosive materials. Jet pumps such as jets and eductors are in this category. These types of momentum pumps, also sometimes called siphons or exhausters, usually are designed for pumping against a low head, e.g., pressures less than the pressure of the fluid used for pumping. The injector is a specialized type of jet pump which is operated by steam for boiler feed and other similar applications. In injectors, the pumped fluid is transferred to a space under the same pressure as the steam used in the injector.

Venturi nozzles are typically used to develop a suction from the momentum of a pumping fluid. The suction can be used to pull or pump a second fluid into the stream of flow.

Carburetors are well known liquids and gas contacting apparatus using a venturi to pump and to mix fuel with air. The resulting fuel mixture typically is used in an automobile internal combustion engine. A subatmospheric pressure on the engine side of the throttle provides the low pressure against which the carburetor operates as one type of eductor.

A good source of background information in this area is found in Perry's *Chemical Engineering Handbook*. For example, standard venturi meters are described, and standard dimensional proportions are recommended, including entrance and exit cone angles as well as throat length. Discharge coefficients for venturi meters are described in Perry's as the ratio of actual flow to theoretical flow taking into allowance stream contraction and frictional effects in the venturi. The discharge coefficient depends upon Reynolds Number and to a minor extent upon the size of the venturi, increasing with diameter.

Conventional fluid flow measurement is accomplished by velocity meters which can take the form of pitot tubes, radial vane meters, turbine flow meters, and others. Another fluid flow measurement device is a head meter which includes the venturi meter. The rate of discharge from the head meter can be calculated after determining pressure reduction, flow area at the constriction, flow density, and the coefficient of discharge. Area meters are another fluid flow measurement device, and these include rotameters. Perry's describes rotameters as capable of covering over a tenfold range of flow, and by providing "floats" of different densities, a 200-fold range is practicable. Rotameters are available with pneumatic, electric, and electronic transmitters for actuating remote recorders, integrators, and automatic flow controllers.

Corrosive and volatile high density liquids are very difficult and expensive to pump and meter through conventional pumps and meters. The corrosive nature of the fluids is damaging to conventional mechanical pumps. The volatile nature of the fluid typically creates problems when service temperatures at the point of application are higher than the boiling point of the fluid. Such fluids are difficult to handle and meter as liquids through conventional flow meters particularly where the liquid has a high density and must be pumped at low flow rates.

It is an object of this invention to provide an apparatus for the simple and accurate flow control of corrosive and volatile liquids.

A further object of this invention is to provide an apparatus for pumping and metering a corrosive and volatile high density liquid at low flow rates.

It is another object of the present invention to provide an apparatus for pumping a fluid by employing the momentum of a first fluid through an aspirator to pump a second fluid and to produce a controllable mixture of the first and second fluids in a predetermined composition independent of flow rates.

Other objects of this invention will become apparent from an inspection of the Summary and Detailed Description of the invention which follow.

SUMMARY OF THE INVENTION

The present invention includes means for pumping, mixing, and metering a primary fluid with a secondary fluid. The invention includes means for mixing the primary and secondary fluids to form a mixture having a constant volume fraction independent of flow rate and consisting essentially of vapor. The invention further includes means for measuring the vapor mixture to determine primary fluid flow rate.

In one aspect, the present invention includes a fluid control device for controlling the flow of a corrosive, volatile liquid including a flow casing, a venturi insert within the flow casing; the insert selected to have specified proportions including discharge coefficient; and means for passing the liquid through a liquid orifice of specified discharge coefficient and into the venturi at a position at or near the vena contracta; whrein $C_{DV}=$ the discharge coefficient of the venturi, $C_{D2}=$ the discharge coefficient of the liquid orifice, and $C_{DV}/C_{D2}$ form as a substantially linear proportionality over a wide range of flow rates through the venturi.

THE DRAWINGS

FIG. 1 is a sectioned elevational view of the pumping and metering apparatus of the present invention.

FIG. 2 is a sectioned elevational view of a venturi insert.

DETAILED DESCRIPTION

The apparatus of the present invention provides controlled pumping and metering of a primary fluid with a secondary fluid or diluent. The invention includes means for aspirating and mixing the primary fluid into the secondary fluid or diluent such that the mixture is maintained in a vapor state and in a predetermined concentration.

In one embodiment, the present invention provides an apparatus for controlling low rates of flow of a corrosive, volatile liquid, including means for aspirating and mixing the liquid into a diluent gas of high relative vapor pressure to form a gaseous mixture consisting essentially of a vapor and having a substantially constant volume fraction independent of flow rates, and means for metering the flow rate of the vapor mixture produced. The invention includes means for passing the diluent gas through a venturi of specified proportions including discharge coefficient and means for pumping the liquid by venturi suction to pass through a liquid orifice of specified discharge coefficient and to pass into the venturi, wherein the venturi discharge coefficient relative to the liquid orifice discharge coefficient forms a substantially linear proportionality over a wide range of flow rates through the venturi.

The present invention utilizes a secondary fluid, e.g., such as a diluent gas, having a high relative vapor pressure. High relative vapor pressure is defined in this context as a vapor pressure substantially in excess of the vapor pressure of the primary fluid. In this way, the mixture of primary and secondary fluids forms a gaseous mixture consisting essentially of vapor. Otherwise, undesirable entrained droplets of liquid will remain in the fluid mixture. Such entrained droplets or condensation will defeat the essential character of the present invention by altering the constant ratio of primary fluid to secondary fluid achieved through the method and apparatus of the present invention.

The venturi aspirator portion of the present invention provides for a constant proportion mixing of the primary fluid and secondary fluid, e.g., such as liquid $SiCl_4$ and argon gas. The essentially constant ratio of primary fluid to secondary fluid can be established by properly selecting the cross-sectional areas of the venturi and/or liquid orifice. This can be accomplished only if the venturi discharge coefficient $C_{DV}$ and the discharge coefficient for the liquid orifice $C_{D2}$ form a substantially linear proportionality over a wide range of flow rates through the venturi. The flow rates through the venturi can be related by the Reynolds Numbers parameter. A constant ratio primary fluid to secondary fluid is achieved through the present invention irrespective of flow rates. That is, the flow rate of secondary fluid through the venturi can vary high or low from a reference flow rate, and yet the fraction of primary fluid in the final mixture will remain essentially constant.

In one embodiment, the apparatus of the present invention requires a venturi having specified proportions including discharge coefficient and specified venturi entrance orifice area, entrance and exit cone angles, and throat length as it applies to a particular liquid to be pumped, e.g., such as silicon tetrachloride.

The invention is suitable for pumping and metering fluids similar to $SiCl_4$ such as $TiCl_4$ or other volatile corrosive fluids. In place of argon as the secondary fluid, other non-reactive diluent gases can be substituted such as helium or any other inert or non-reactive gas having a high relative vapor pressure with respect to the primary fluid.

By way of example, the invention is particularly suited for mixing liquid silicon tetrachloride into an inert gas stream, e.g., of argon, to form a mixture consisting essentially of vapor and having a concentration ratio of components which is essentially constant. The example is drawn from a metal treatment system as described in U.S. Pat. No. 4,392,888, which is hereby incorporated by reference. The referenced metal treatment system uses silicon tetrachloride as a fluorine acceptor in treating molten aluminum. The flow rate of the silicon tetrachloride is low so that the amount of silicon introduced into molten aluminum will be only relatively miniscule. $SiCl_4$ liquid has a high specific gravity, i.e., about 1.48. The $SiCl_4$ is a liquid at room temperature but quickly vaporizes upon ingestion into the moving stream of argon, $O_2$, and $C_2Cl_2F_2$ as employed in the process of U.S. Pat. No. 4,392,888. However, the temperature of the metal treatment plant typically is higher than that commonly referred to as room temperature, i.e., higher than about 70° F. $SiCl_4$ is considered a corrosive fluid and will vigorously attack containment materials. In this way, a system is described in which very small amounts of a volatile and corrosive high density liquid are required to be pumped in a metered form at an elevated temperature. The $SiCl_4$ flow has been found to be extremely difficult to control through conventional pumps and variable area meters, particularly at low flow rates.

The present invention involves pumping and mixing a primary fluid with a secondary fluid such as a diluent gas to form a vapor mixture at a substantially constant predetermined volume fraction such that condensation does not occur at the pressure and temperature conditions under which the mixture is used. In the case of a primary fluid of $SiCl_4$, a volume (mole) fraction of 0.2 $SiCl_4$ in a secondary fluid of argon gas will maintain a completely vaporous phase at ambient temperatures at and above 90° F. and at system pressures of 16 psig and below. In the case of primary fluids other than $SiCl_4$, a preliminary step involves determining a mole fraction of primary fluid in the secondary fluid at selected service temperatures and pressures which will remain completely in the vapor state. Condensation or entrained droplets of liquid in the mixture of primary and secondary fluids are not acceptable for the reason that the mixture must have a constant and predetermined volume fraction. Such a constant volume fraction mixture is required so the mixture can be metered through conventional variable area rotameter apparatus to determine or measure primary fluid flow rates. The invention includes a venturi aspirator to provide a constant proportion mixing of the primary fluid in the secondary fluid.

A complete description and understanding of the invention will be facilitated by reference to the illustrations presented in the figures and the description which follows.

Referring to FIG. 1, a primary fluid which can be a corrosive and volatile high density liquid, e.g., silicon tetrachloride, is introduced at 1 and is passed through conduit 2 to reservoir vessel 3. The liquid level is maintained at 4 through conventional level maintainence techniques such as by float valves or electromechanical level controllers (not shown). Liquid level 4 is maintained at an elevation above the inlet orifice 6 of liquid conduit 7.

The primary fluid, e.g., in this case being a liquid, is raised or elevated through conduit 7 by suction or vacuum. Liquid rises in conduit 7 and enters flow casing 9. Liquid is received from conduit 7 into flow casing 9 through channel 11. Channel 11 can have a constricted throat 12 to provide a smooth transition from a larger to smaller pipe diameter. Liquid flowing through channel 11 is viewed as the primary fluid. The vacuum or suction used to raise or elevate the primary fluid is provided by the flow of a secondary fluid through casing 9. Secondary fluid in the form of gas in this example enters flow casing 9 at 13 and is directed into venturi insert 14. The venturi facilitates the suction applied on the primary fluid.

The primary and secondary fluids meet in chamber 16 and proceed to flow through exit cone 17. By the time the primary and secondary fluids are discharged from exit cone 17, the fluids are thoroughly mixed. Such a mixture is achieved by adhering to prescribed dimensions and angles for the venturi.

Venturi insert is a term used to refer to a machined piece such as venturi insert 14 which can be readily inserted into flow casing 9 as shown in FIG. 1. The insert can be machined in such a way to alter the dimensions of the venturi. In this way, different venturi dimensional systems are adaptable for various fluid systems. Venturi dimensions have been found to be critical in the sense that standard dimensions when held constant are inoperative for particular fluid systems. For example, very low flow rates have been found to be inoperative at standard entrance cone angles of $21°\pm2°$.

Venturi insert 14 is more completely illustrated in FIG. 2. The entrance cone angle is indicated in FIG. 2 by $Y°$. In accordance with the present invention, secondary fluid enters venturi insert 14 through entrance orifice 41 having diameter $D_o$. The entrance orifice optionally can be countersunk at an angle of $Z°$ which typically will range from about 40° to 80°. Fluid passes through the entrance orifice, passes through entrance cone 43, and forms a vena contracta at about position 44 in throat 45. Throat 45 of the venturi has diameter $D_T$ and length $S_T$. The total length of the insert is indicated by $S_I$.

In one embodiment of the present invention, silicon tetrachloride liquid is the primary fluid and an inert gas such as argon serves as the secondary fluid or diluent. Very low flow rates of silicon tetrachloride are required to be pumped and metered for supplying downstream metal treatment. The final mixture of fluids will contain $SiCl_4$ in a predetermined mole fraction of about 0.2. Flow rates of argon gas entering flow casing 9 range from about 180 to 200 standard cubic feet per hour. An efficient vacuum is achieved through a venturi as established by venturi insert 14 having an entrance cone angle $Y°$ in the range of about $15°\pm3°$. Entrance orifice areas can range from about 0.003 in.² to about 0.03 in.². For establishing a mole fraction of 0.2 $SiCl_4$ in argon, the entrance orifice area should be about 0.009. For components other than $SiCl_4$ in argon, the $D_V/D_2$ area ratio can be calculated, and the appropriate discharge coefficients then can be obtained experimentally. The throat length of the venturi should range from about 0.5 to about 8 throat diameters depending on flow rate. Exit cone angle should be in the range of about $10°\pm3°$, and the exit cone length should be about 5 to 20 diameters, also flow rate dependent.

Fluid leaving exit orifice 18 and proceeding left to right as indicated in FIG. 1 enters outlet chamber 19 of flow casing 9. The fluid channel connecting venturi exit orifice 18 having exit orifice diameter $D_E$ and exit chamber 19 of the float casing can be tapered as shown at 21. The mixed fluid passes through exit chamber 19 and exits flow casing 9. In this example, where $SiCl_4$ has a high heat of vaporization, makeup heat is added to prevent condensation. The fluid mixture subsequently is metered through conventional fluid measuring devices such as by rotameter 22.

Rotameter 22 has controlling means 23 for controllably adjusting fluid flow. In this manner, the primary fluid in the mixture flowing through rotameter 22 is adjusted in response to proportional mixture flow rate through the rotameter.

Pressures can be equilibrated between exit chamber 19 and primary fluid reservoir 3 through pressure balance line 24. The pressure balance line is designed to equilibrate pressure at a position, e.g., at position 26, downstream from the vena contracta of the venturi. Pressure balance is required to maintain a flow of primary fluid from the reservoir to the venturi. The liquid reservoir pressure is equilibrated to a position downstream from the venturi for the purpose of maintaining flow proportionality in this closed system.

A volume ratio of pumped liquid, e.g., such as silicon tetrachloride, to carrier diluent, e.g., such as a diluent gas of argon, can be calculated from liquid vapor pressure and system operating conditions of temperature and pressure. The Clausius Clapeyron or Antone equations can be used to calculate the vapor pressure of liquids for which this information is not directly tabulated. For the purpose of the present illustration, assume a ratio of 5 for the diluent to liquid (in vapor state).

This volume ratio can be converted to a diluent to liquid (in liquid state) ratio by multiplying the volume ratio by the ratio of liquid-liquid phase density ($\rho_L$) to liquid-vapor phase density ($\rho_V$). In this illustrative embodiment, the liquid-liquid phase is 95 lbm/ft³ and the liquid-vapor phase density is 0.4 lbm/ft³. On a volumetric basis, the ratio of diluent gas to liquid is 1188

$$R_{V-L(L)} = R_{V-L(V)} \frac{(\rho_L)}{(\rho_V)} = 5 \frac{(95)}{(0.4)} = 1188 \tag{1}$$

wherein $R_{V-L(L)}$ = Diluent-Liquid (Liquid phase ratio)

The apparatus of the present invention provides means for introducing a diluent gas, e.g., such as argon, into a converging nozzle with a vena contracta of area $A_T$, e.g., such as over circular area provided by diameter $D_T$, depicted in FIG. 2, at a pressure $P_1$. By the equations of energy and mass, a pressure drop, $\Delta P_v = P_1 - P_2$ occurs at velocity $V_T$ through $A_T$. In addition, the hydrostatic pressure $P_f$ at the liquid flow control orifice is given by $P_f = \rho_f h_f$, where $\rho_f$ is the fluid density and $h_f$ is the height of the fluid over the flow control orifice. The total pressure drop $\Delta P$ is the sum of $\Delta P_v$ and $P_f$. Thus, $\Delta P = \Delta P_v + P_f$. The following expression relates $\Delta P$, $A_T$, and diluent flowrate $Q_d$.

$$Q_d = A_T V_T \tag{2}$$

The velocity at $A_T$ can also be expressed as follows:

$$V_T = C_{DV} \sqrt{2g \, \Delta P / \rho(\text{diluent})} \tag{3}$$

where
$C_{DV}$ = discharge coefficient at vena contracta, and
$\rho$(diluent) = diluent density.
Equations (2) and (3) can be combined as follows:

$$Q_d = C_{DV} A_T \sqrt{2g \, \Delta P/\rho(\text{diluent})} \quad (4)$$

A similar expression will describe the volume flowrate $Q_L$ of liquid to be pumped, e.g., silicon tetrachloride, the liquid orifice area $A_2$, e.g., such as provided by diameter $D_2$ shown in FIG. 1.

$$Q_L = C_{D2} A_2 \sqrt{2g \, \Delta P/\rho(\text{liquid})} \quad (5)$$

The flowrates are expressed as a ratio as follows:

$$\frac{Q_d = C_{DV} A_T \sqrt{2g \, \Delta P/\rho(\text{diluent})}}{Q_L = C_{D2} A_2 \sqrt{2g \, \Delta P/\rho(\text{liquid})}} = R_{V-L(L)} \quad (6)$$

$$\frac{C_{DV} A_T \sqrt{1/\rho(\text{diluent})}}{C_{D2} A_2 \sqrt{1/\rho(\text{liquid})}} = \frac{K_T C_{DV} A_T}{K_2 C_{D2} A_2} \quad (7)$$

wherein $K_T = \sqrt{1/\rho(\text{diluent})}$
$K_2 = \sqrt{1/\rho(\text{liquid})}$ $$R_{V-L(L)} = \frac{K_T C_{DV} A_T}{K_2 C_{D2} A_2} \quad (8)$$

In the present illustration, $R_{V-L(L)}$ is 1188.

$$R_{V-L(L)} = 1188 = \frac{\sqrt{1/0.4} \, C_{DV} A_T}{\sqrt{1/95} \, C_{D2} A_2} \quad (9)$$

$$\frac{C_{DV} A_T}{C_{D2} A_2} = 77 \quad (10)$$

Two criteria are used to size the diluent venturi throat area. First, since the diluent gas velocity cannot exceed the speed of sound in this type venturi, a minimum $A_T$ ($D_V$, min) exists. Secondly, $C_{DV}$ reaches an essentially constant value when the Reynolds number exceeds 30,000. For the venturi to have an invariant $C_D$, a maximum value of $A_T$ ($D_V$, max) is specified as follows:

$A_T$, min($D_V$, min):
Maximum diluent flow, $Q_{max}=250$ ft$^3$-hr$^{-1}$ speed of sound in diluent (argon), Vs=$3.7\times10^6$ ft-hr$^{-1}$ (at T=25° C., P=40 psi a) minimum throat diameter, $D_V$, min $$V_s = Q/A_T \min = \frac{4Q_{max}}{\eta D^2_{min}} \quad (11)$$

$$\text{Thus, } D = \sqrt{\frac{4Q_{max}}{\eta V_s}} \sqrt{\frac{4(250)}{\eta(3.7 \times 10^{-6})}} = .0093 \text{ ft} \quad (12)$$

or $A_T$, min=$7\times10^{-5}$ ft$^2$
Thus, the minimum venturi throat diameter is 0.0093 ft since diluent flow in the venturi is limited to sonic velocity.

Next, the Reynolds number at the minimum specified diluent flowrate and $D_V=0.0093$ ft must be calculated:

$$Re = \frac{4Q_{min}\rho}{\eta D_V n} \quad (13)$$

where
$\rho$ = Diluent (argon) density = 0.1 lbm-ft$^{-3}$
n = Diluent Newtonian viscosity = 0.12 lbm-ft$^{-1}$-hr$^{-1}$
$D_V$ = Venturi throat diameter
$Q_{min}$ = 100 ft$^3$-hr$^{-1}$
Thus, $$Re = \frac{(4)(100)(.1)}{\eta(.0093)(.12)} = 11,400 \quad (14)$$

Since Re<30,000 $C_{DV}$, immunity, or invariance, does not exist, and the functionality between Re and $C_{DV}$ is experimentally determined. The experimental procedure is to fabricate a venturi configured as depicted in FIG. 2. Since in this case $A_T$ max effectively does not exist, a $D_V=0.01$ ft was selected to provide assurance that Vs would not be attained. The diluent flowrate range of 100–250 ft$^3$-hr$^{-1}$ is used to calculate a Reynolds number range of 11,400 to 28,500.

The functionality between $C_{DV}$ and Re is determined within this range. This is in the laboratory using argon and measuring the actual gas flowrate with a rotameter. The theoretical flowrate for a given pressure drop is given by:

$$VT = \sqrt{\frac{2g \, \Delta P}{\rho}} \quad (15)$$

where
$\Delta P$ = Pressure drop at orifice
$\rho$ = Gas density corrected for pressure.
Since:

$$C_D = (VA/VT) \quad (16)$$

where
VA = Actual Velocity (measured)
Values of $C_D$ are experimentally determined as a function of Reynolds number. In the example, $C_D$ varied over a range of 0.89 to 0.94 for a Reynolds number range of 11,400 to 28,500, respectively. A 5% variation (2.5% about mean $C_D$) in $C_D$ was accepted. Rigorously, a polynomial can be obtained that expresses $C_D$ as a function of Reynolds number of the secondary fluid orifice (exit-entrance angle, etc.) and can then be incrementally varied until the same functionality of $C_D$ and Reynolds number as the venturi orifice is obtained.

Since $A_T$ is known ($7\times10^{-5}$) and the mean $C_{DV}$ is 0.92, the product $A_T C_{DV}$ is known ($6.4\times10^{-5}$ ft$^2$). Recall from equation (10) that:

$$\frac{C_{DV} A_T}{C_{D2} A_2} = 77 \quad (10)$$

Thus,

-continued $$C_{D2}A_2 = \frac{C_{D2}VA_T}{77} = \frac{7 \times 10^{-5} \text{ ft}^2}{77} = 9.1 \times 10^{-7} \text{ ft}^2 \quad (17)$$

Assuming that $C_{D2}=1$, $A_2=9.1\times10^{-7}$ ft and $D_2=0.0011$ ft, the diluent gas flowrate ($Q_d$) range is 100–250 ft-hr$^{-1}$, and $Q_d=Q_L/1188$; where $Q_L$ is the liquid flowrate, and 1188 is obtained from equation (1). The range of $Q_d$ is then 0.08 ft-hr$^{-1}$. Thus, the liquid orifice Reynolds number range (calculated) is 4040 to 10,600 (using the liquid kinematic properties of $\eta=0.9$ cP and $\rho=95$ lbm-ft$^{-3}$. As in the previous step, $C_{D2}$ was found to vary from 0.78 to 0.81 over this Reynolds number range, and a mean value of $C_{D2}=0.80$ was selected.

Finally, $A_2$ can be calculated:

$$A_2 = \frac{9.1 \times 10^{-7} \text{ ft}^2}{C_{D2}} \quad \frac{9.1 \times 10^{-7} \text{ ft}^2}{0.80} = 1.1 \times 10^{-6} \text{ ft}^2 \quad (18)$$

$A_2$, the liquid orifice area, is now known ($1.1\times10^{-6}$ ft$^{-2}$) as is $A_T$ ($7\times10^{-5}$ ft$^2$).

$$\frac{A_T}{A_2} = 63.6 \quad (19)$$

Similarly, $$\frac{D_V}{D_2} = \frac{.0093 \text{ ft}}{.0012 \text{ ft}} = 7.8 \quad (20)$$

Although some experimental data are used in the design of the device, the procedure is not trial and error.

The apparatus of the present invention is particularly suited for pumping and metering very low flow rates of a volatile and corrosive high density liquid such as TiCl$_4$ or such as silicon tetrachloride as used in the metal treatment system disclosed in U.S. Pat. No. 4,392,888. In this embodiment the apparatus of the invention can be constructed from metals such as austenitic stainless steels and nickel base alloys to withstand the corrosive nature of the SiCl$_4$.

What is claimed is:

1. Fluid flow control apparatus comprising:
   an aspirator including a liquid orifice and a venturi for pumping at a low flow rate such that the Reynolds number is less than 30,000 and mixing a liquid into a diluent gas to form a vapor mixture having a substantially constant volume fraction independent of flow rates; and
   means for metering the flow rate of said vapor mixture;
   wherein said aspirator comprises said venturi and said liquid orifice having a configuration such that its venturi discharge coefficient $C_{DV}$ and its liquid orifice discharge coefficient $C_{D2}$ forms a ratio $C_{DV}/C_{D2}$ substantially linear over flow rates below the said Reynolds number of 30,000 above which the discharge coefficients become invariant.

2. The apparatus of claim 1 wherein said aspirator comprises means for equilibrating a static pressure at said liquid orifice in relation to a pressure change imposed by said means for metering and further comprising means for controllably adjusting the flow of said liquid into said venturi.

3. The apparatus of claim 2 wherein said liquid orifice comprises a metering orifice for adjusting flow rate.

4. The apparatus of claim 2 wherein said liquid comprises SiCl$_4$ or TiCl$_4$ and said diluent gas comprises an inert gas.

5. The apparatus of claim 4 wherein said specified venturi proportions include an entrance cone angle of about 15°±3°.

6. The apparatus of claim 5 wherein said specified venturi proportions include entrance orifice area of about 0.009 in.$^2$.

7. A fluid control device for controlling flow of a corrosive, volatile liquid comprising:
   a flow casing;
   a venturi insert within said flow casing, said insert selected to have specified proportions including a discharge coefficient;
   a liquid orifice of specified discharge, coefficient; and
   means for passing at a low rate of flow such that the Reynolds number is less than 30,000 said liquid by venturi suction through said liquid orifice of specified discharge coefficient and into the venturi at a position at or near the vena contracta of said venturi;
   wherein,
   $C_{VD}$=the discharge coefficient for the venturi;
   $C_{D2}$=the discharge coefficient for the liquid orifice; and
   $C_{DV}/C_{D2}$ forms a substantially linear proportionality over flow rates below the said Reynolds number of 30,000 above which the discharge coefficients become invariant.

8. A device as set forth in claim 7 wherein said means for passing further comprises a liquid reservoir communicating with said liquid orifice and means for equalizing pressure between said reservoir and a position downstream from the vena contracta of the venturi.

9. A flow control device as set forth in claim 8 wherein said means for equalizing pressure comprises a pressure balance line communicating with said reservoir and a position downstream from the vena contracta.

10. A flow control device as set forth in claim 9 further comprising means for metering fluid flow at a position downstream from the venturi.

11. A flow control device as set forth in claim 10 wherein said metering means is adapted to controllably adjust said liquid orifice.

12. A flow control device as set forth in claim 11 wherein said entrance cone angle comprises 15°±3°.

13. In an aspirator for pumping a primary fluid employing the momentum of a secondary fluid, the improvement for measuring flow rates of said primary fluid by controllably mixing said primary and secondary fluids and metering the mixture to form a metered mixture of predetermined composition independent of flow rates, comprising:
   a venturi;
   means for passing said secondary fluid through said venturi having a discharge coefficient $C_{DV}$;
   a primary fluid orifice;
   means for pumping said primary fluid at a low flow rate such that the Reynolds number is less than 30,000 through suction by said venturi to pass through said primary fluid orifice having discharge coefficient $C_{D2}$;
   wherein,
   $C_{DV}$=the discharge coefficient for the venturi;

$C_{D2}$ = the discharge coefficient for the primary fluid orifice; and $C_{DV}/C_{D2}$ forms a substantially linear proportionality over flow rates below the said Reynolds number of 30,000 above which the discharge coefficients become invariant; and means for mixing and measuring said primary and secondary fluids.

14. An aspirator as set forth in claim 13 wherein said primary fluid orifice comprises a metering orifice for adjusting flow rate.

15. An aspirator as set forth in claim 14 wherein said secondary fluid comprises a gas and said primary fluid comprises a liquid.

16. An aspirator as set forth in claim 10 wherein said gas comprises an inert gas and said liquid comprises $SiCl_4$ or $TiCl_4$.

17. An aspirator as set forth in claim 16 wherein said specified venturi proportions include an entrance cone angle of about $15° \pm 3°$.

18. An aspirator as set forth in claim 17 wherein said specified venturi proportions include entrance orifice area of about 0.009 in.$^2$.

* * * * *

UNITED STATES PATENT AND TRADEMARK OFFICE
CERTIFICATE OF CORRECTION

PATENT NO. : 4,634,560
DATED : January 6, 1987
INVENTOR(S) : Charles E. Eckert

It is certified that error appears in the above-identified patent and that said Letters Patent is hereby corrected as shown below:

| | |
|---|---|
| Col. 2, line 5 | Change "flow" to --fluid--. |
| Col. 7, line 49 | Change "$C_D$" to --$C_{D_2}$--. |
| Claim 1, Col. 9, line 49 | After "pumping" insert --and mixing a liquid--. |
| Claim 1, Col. 9, line 50 | After "30,000" delete "and mixing a liquid". |
| Claim 7, Col. 10, line 26 | Change "$C_{VD}$" to --$C_{DV}$--. |
| Claim 16, Col. 12, line 1 | Change "10" to --15--. |

Signed and Sealed this

Twenty-eighth Day of April, 1987

Attest:

DONALD J. QUIGG

Attesting Officer

Commissioner of Patents and Trademarks